US010534480B2

(12) United States Patent
Drumm et al.

(10) Patent No.: US 10,534,480 B2
(45) Date of Patent: *Jan. 14, 2020

(54) INSTRUMENT DETECTION WITH AN OPTICAL TOUCH SENSITIVE DEVICE

(71) Applicant: Rapt IP Limited, Mriehel (MT)

(72) Inventors: Owen Drumm, Dublin (IE); Robert Copperwhite, Dublin (IE)

(73) Assignee: Rapt IP Limited, Mriehel (MT)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,395

(22) Filed: Jul. 22, 2019

(65) Prior Publication Data
US 2019/0346965 A1   Nov. 14, 2019

Related U.S. Application Data

(63) Continuation of application No. 14/842,719, filed on Sep. 1, 2015, now Pat. No. 10,402,017.

(60) Provisional application No. 62/044,875, filed on Sep. 2, 2014.

(51) Int. Cl.
| G06F 3/042 | (2006.01) |
| G06F 3/041 | (2006.01) |
| G06F 3/0488 | (2013.01) |
| G06F 3/043 | (2006.01) |
| G06F 1/3234 | (2019.01) |

(52) U.S. Cl.
CPC ............ *G06F 3/0421* (2013.01); *G06F 3/043* (2013.01); *G06F 3/0416* (2013.01); *G06F 3/0488* (2013.01); *G06F 1/3262* (2013.01); *G06F 2203/04106* (2013.01); *G06F 2203/04109* (2013.01)

(58) Field of Classification Search
None
See application file for complete search history.

(56) References Cited

U.S. PATENT DOCUMENTS

| 8,531,435 | B2 | 9/2013 | Drumm |
| 8,723,839 | B2 | 5/2014 | Drumm |
| 2002/0075243 | A1 | 6/2002 | Newton |
| 2004/0263482 | A1 | 12/2004 | Goertz |
| 2006/0114237 | A1 | 6/2006 | Crockett et al. |
| 2006/0227120 | A1 | 10/2006 | Eikman |

(Continued)

OTHER PUBLICATIONS

United States Office Action, U.S. Appl. No. 14/842,714, dated Oct. 28, 2016, 10 pages.

(Continued)

*Primary Examiner* — Stephen T. Reed
(74) *Attorney, Agent, or Firm* — Fenwick & West LLP

(57) ABSTRACT

An optical touch-sensitive device detects touch events caused by instruments (e.g., pens, styluses) and distinguishes these events from touch events caused by fingers. In some embodiments, different instruments can also be distinguished. The optical touch-sensitive device includes multiple emitters and detectors. Each emitter produces optical beams which are received by the detectors. The optical beams preferably are multiplexed in a manner so that many optical beams can be received by a detector simultaneously. Touch events disturb the optical beams, for example due to frustrated total internal reflection. Information indicating which optical beams have been disturbed is analyzed to detect one or more touch events. The analysis also distinguishes instrument touch events from finger touch events.

31 Claims, 12 Drawing Sheets

(56) References Cited

U.S. PATENT DOCUMENTS

| | | |
|---|---|---|
| 2007/0052693 A1 | 3/2007 | Watari |
| 2008/0088603 A1 | 4/2008 | Eliasson et al. |
| 2008/0192015 A1 | 8/2008 | Lieberman |
| 2012/0169672 A1 | 7/2012 | Christiansson |
| 2012/0212457 A1 | 8/2012 | Drumm |
| 2012/0249477 A1 | 10/2012 | Popovich et al. |
| 2013/0021300 A1 | 1/2013 | Wassvik |
| 2013/0044073 A1 | 2/2013 | Christiansson et al. |
| 2013/0162877 A1 | 6/2013 | Wang et al. |
| 2016/0062550 A1 | 3/2016 | Drumm et al. |

OTHER PUBLICATIONS

United States Office Action, U.S. Appl. No. 14/842,719, dated Dec. 27, 2018, 18 pages.
United States Office Action, U.S. Appl. No. 14/842,719, dated Dec. 2, 2016, 11 pages.
United States Office Action, U.S. Appl. No. 14/842,719, dated Jul. 5, 2018, 13 pages.
United States Office Action, U.S. Appl. No. 14/842,719, dated May 31, 2017, 11 pages.
United States Office Action, U.S. Appl. No. 14/842,719, dated Nov. 17, 2017, 12 pages.
United States Office Action, U.S. Appl. No. 15/603,310, dated Jun. 29, 2017, 7 pages.

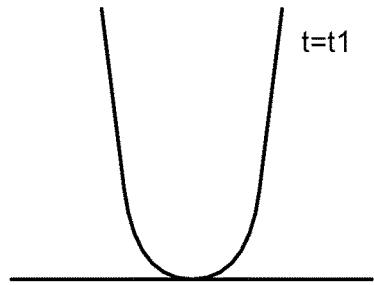 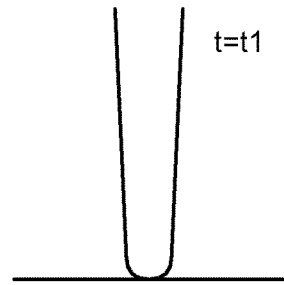 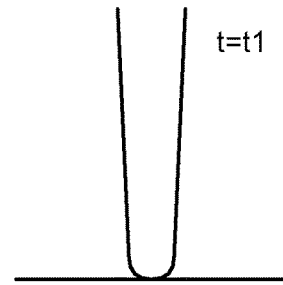
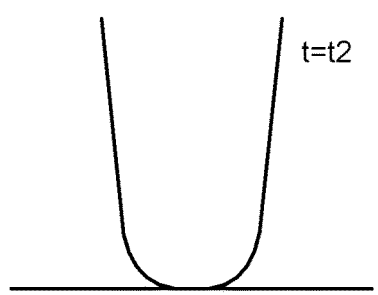 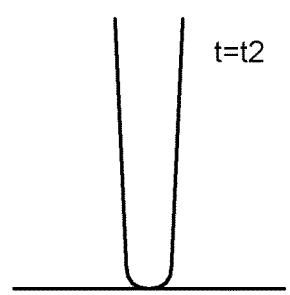 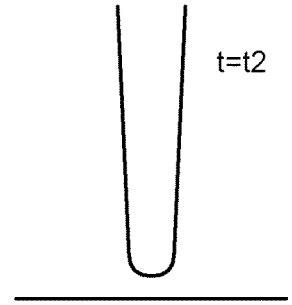
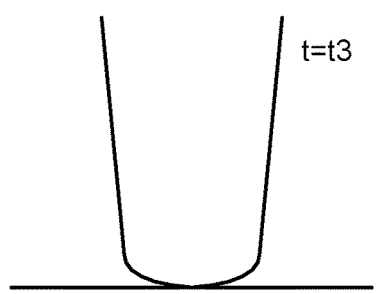 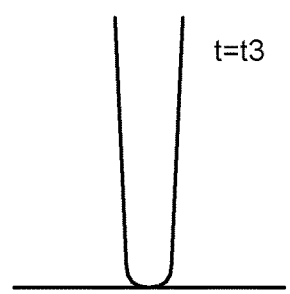 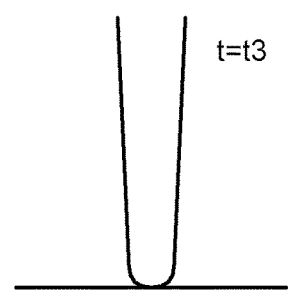
FIG. 10A      FIG. 10B      FIG. 10C

INSTRUMENT DETECTION WITH AN OPTICAL TOUCH SENSITIVE DEVICE

CROSS-REFERENCE TO RELATED APPLICATION(S)

This application is a continuation of U.S. patent application Ser. No. 14/842,719, filed Sep. 1, 2015, which claims the benefit under 35 U.S.C. § 119(e) of U.S. Provisional Patent Application No. 62/044,875, filed Sep. 2, 2014, both of which are incorporated by reference.

BACKGROUND

1. Field of Art

This invention generally relates to detecting touch events in a touch-sensitive device.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. Importantly, the ambiguities must be resolved in a speedy and computationally efficient manner. If too slow, then the technology will not be able to deliver the touch sampling rate required by the system. If too computationally intensive, then this will drive up the cost and power consumption of the technology.

Another drawback is that technologies may not be able to meet increasing resolution demands. Assume that the touch-sensitive surface is rectangular with length and width dimensions L×W. Further assume that an application requires that touch points be located with an accuracy of $\delta l$ and $\delta w$, respectively. The effective required resolution is then $R=(L W)/(\delta l\ \delta w)$. We will express R as the effective number of touch points. As technology progresses, the numerator in R generally will increase and the denominator generally will decrease, thus leading to an overall increasing trend for the required touch resolution R.

Thus, there is a need for improved touch-sensitive systems.

SUMMARY

An optical touch-sensitive device detects touch events caused by instruments (e.g., pens, styluses) and distinguishes these events from touch events caused by fingers. In some embodiments, different instruments can also be distinguished.

The optical touch-sensitive device includes multiple emitters and detectors. Each emitter produces optical beams which are received by the detectors. The optical beams preferably are multiplexed in a manner so that many optical beams can be received by a detector simultaneously. Touch events disturb the optical beams, for example due to frustrated total internal reflection. Information indicating which optical beams have been disturbed is analyzed to detect one or more touch events. The analysis also distinguishes instrument touch events from finger touch events.

Instruments can be distinguished from fingers on many different bases. One example is contact area. This can include size, shape and asymmetry of the contact area. The contact area for instruments can also be designed to include multiple disjoint regions. Another example is attenuation rates. Instruments can be constructed from materials which will exhibit a higher attenuation rate than fingers. Temporal behavior can also be used. A finger contacting a surface typically has a different temporal aspect than an instrument contacting a surface. The actual instrument response, with respect to attenuating or enhancing optical beams, can also be engineered to be different than that caused by fingers. Because instruments are manufactured, a much larger variety of responses can be implemented, including redirecting incoming optical beams to different directions and splitting incoming optical beams into multiple outgoing optical beams. Wavelength is yet another degree of freedom that can be used to distinguish instruments, both from fingers and from other instruments.

Active instruments can include the use of emitters and detectors. Emitters can inject additional optical beams into the system. These additional optical beams can be used to detect the presence of the instrument. They can also be designed to identify the instrument. They can also be used as a separate communication channel from the instrument. Detectors can be used in the reverse direction. Optical beams created by emitters on the periphery can be detected and this can be used to detect the presence of the instrument. Detected optical beams can also be used as a communication channel to the instrument. Some instruments may also have additional out of band communications, such as through a wireless channel.

Other modalities may also be used to detect instrument touch events. Examples include palm touches and acoustics. Since an instrument is held in the user's hand, an instrument touch event is often accompanied by a palm touch in the vicinity. This can be used to help identify instrument touch events. Acoustic or vibration information can also be used to distinguish instrument touch events from finger touch events, due to their different acoustic and vibration signatures.

Other aspects include components, devices, systems, improvements, methods, processes, applications, computer readable mediums, and other technologies related to any of the above.

BRIEF DESCRIPTION OF DRAWINGS

Embodiments of the present invention will now be described, by way of example, with reference to the accompanying drawings, in which:

FIG. 10A illustrates a finger touch progressing in time.

FIGS. 10B and 10C illustrate instrument touches progressing in time.

DETAILED DESCRIPTION

Figure 1:
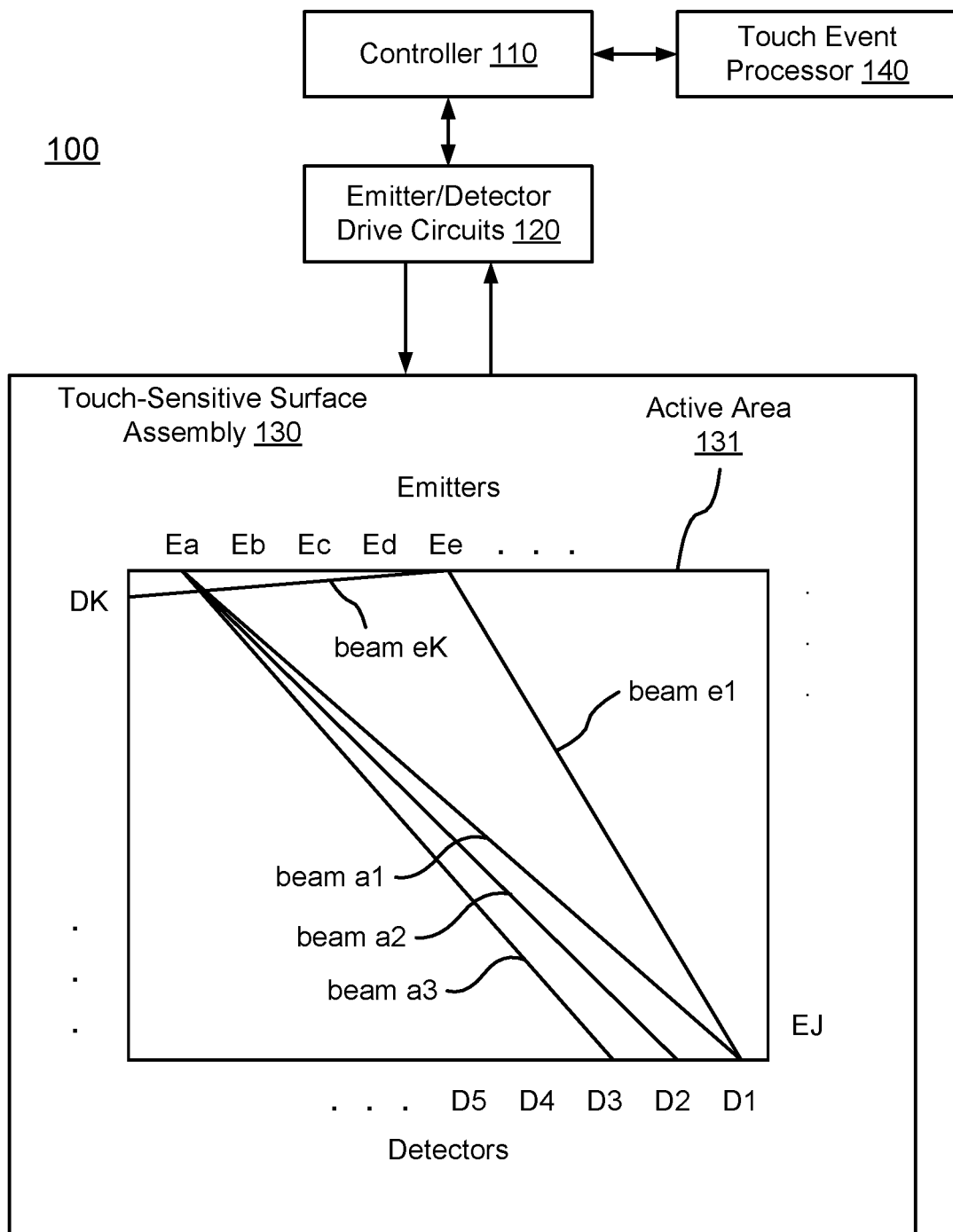
FIG. 1 is a diagram of an optical touch-sensitive device, according to one embodiment.

This detailed description is divided into two parts. Part A provides a description of various aspects of touch-sensitive systems and the detection of multitouch events. These are described in the context of finger touches, but the concepts apply also to instrument (e.g., pen or stylus) touches. Part B provides a description of detecting instrument touches, including distinguishing between different types of instruments. The following is the contents of the detailed description:

Part A: Touch Detection
  I. Introduction
  II. Physical Set-up
  III. Processing Phase
Part B: Instrument Detection
  IV. Introduction
  V. Passive Instrument Detection
  VI. Active Instrument Detection
  VII. Additional Modalities
Part a: Touch Detection
I. Introduction
  A. Device Overview FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active area or active surface, even though the surface itself may be an entirely passive structure. The assembly 130 also includes emitters and detectors arranged along the periphery of the active surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

These touch-sensitive devices can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

B. Process Overview

Figure 2:
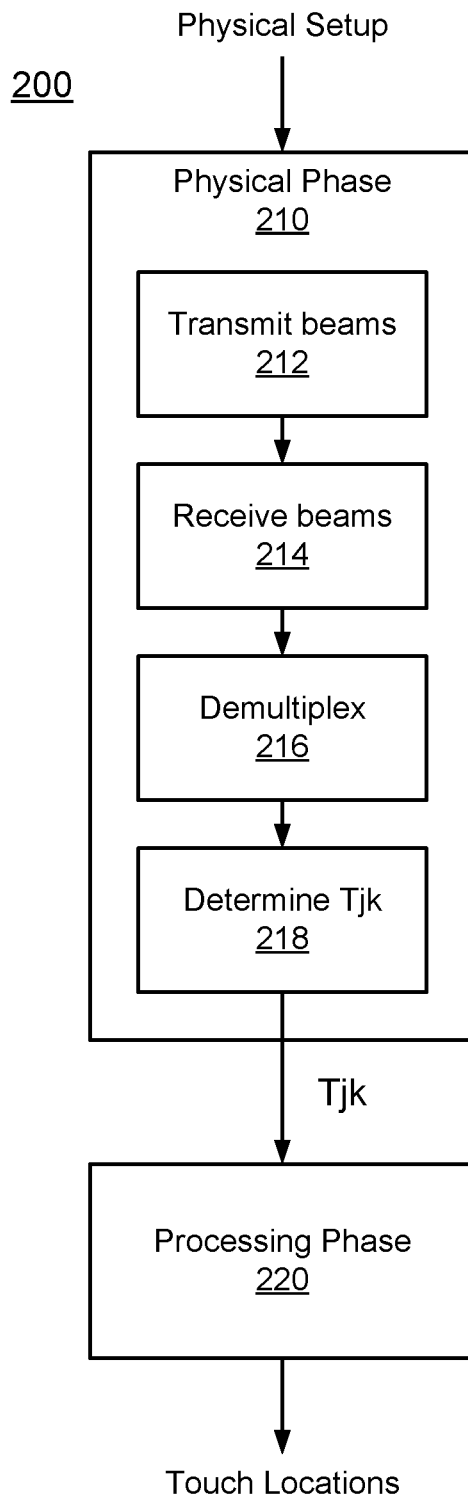
FIG. 2 is a flow diagram for determining the locations of touch events, according to one embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220. Several of these are described below, primarily in Section III.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Figure 3A:
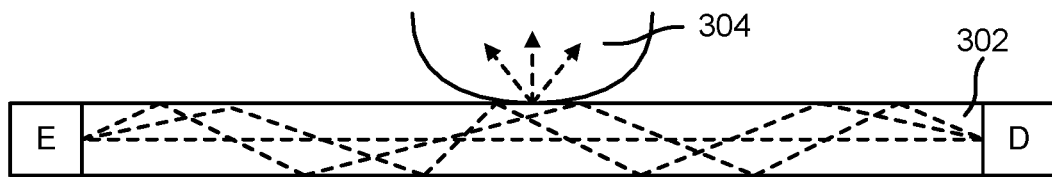
FIGS. 3A-3F illustrate different mechanisms for a touch interaction with an optical beam.

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:

FIG. 3B illustrates a mechanism based on beam blockage. Emitters produce beams which are in close proximity to a surface 306. An object 304 coming into contact with the surface 306 will partially or entirely block beams within the contact area. FIGS. 3A and 3B illustrate some physical mechanisms for touch interactions, but other mechanisms for touch interactions can also be used. For example, the touch interaction may be based on changes in polarization, scattering, or changes in propagation direction or propagation angle (either vertically or horizontally).

Figure 3C:
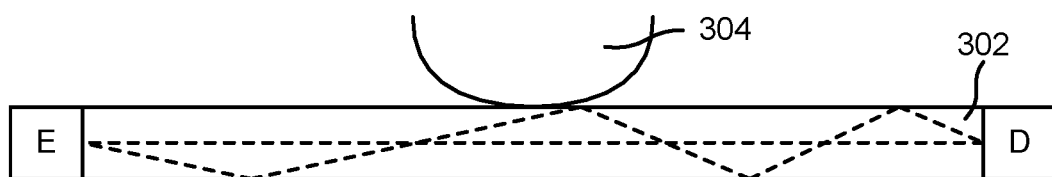

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating. In FIG. 3C, the optical beam travels at a steeper angle of propagation after the touch 304. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
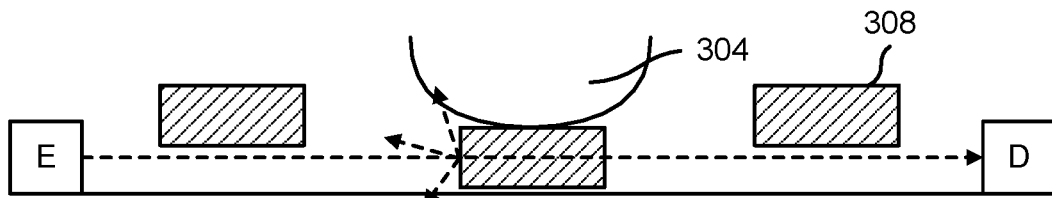

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
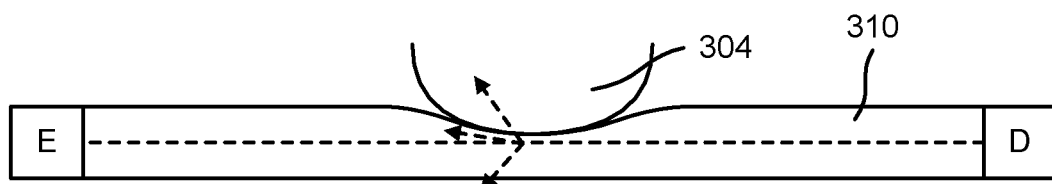

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternately, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

Figure 3F:
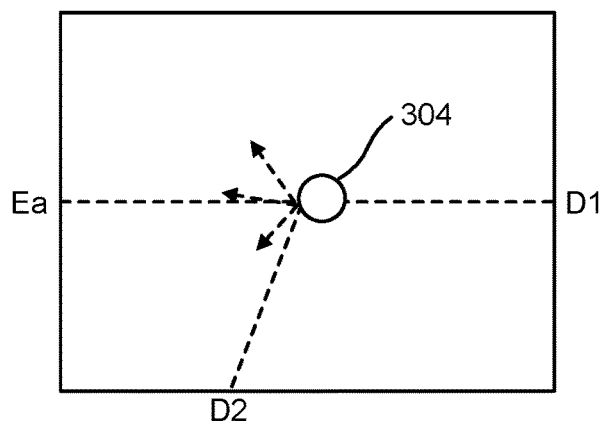

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

As will be described in detail in Part B, if the object 304 is an instrument, the instrument can be designed to have certain touch interaction characteristics. For example, the touch interaction caused by the instrument 304 may vary as a function of wavelength, or the interaction may change as the instrument is tilted, translated, rotated or otherwise moved. The touch interaction with the instrument 304 may also depend on the propagation direction of the optical beam. The instrument 304 may also be an active device, with its own emitter(s) and/or detector(s). It may also include re-emitter(s), which detect incoming optical beams and then re-emit the beams, possibly changing the beams before re-emission.

For simplicity, in the remainder of this Part A, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

Figure 4:
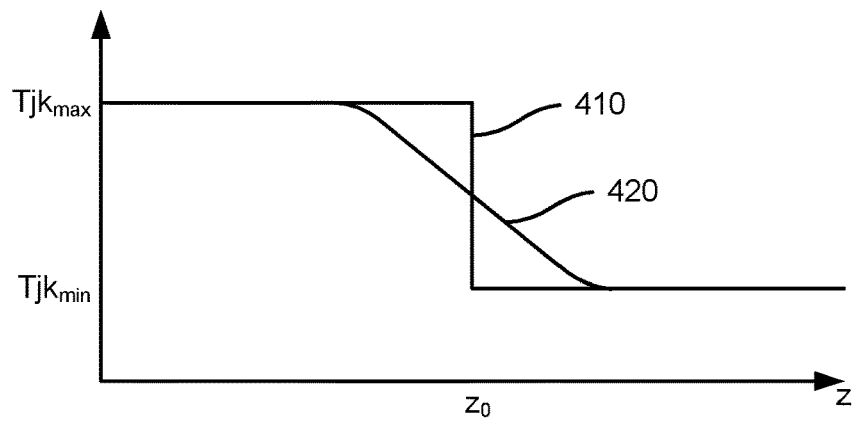
FIG. 4 are graphs of binary and analog touch interactions.

FIG. 4 is a graph illustrating a binary touch interaction mechanism compared to an analog touch interaction mechanism. FIG. 4 graphs the transmittance Tjk as a function of the depth z of the touch. The dimension z is into and out of the active surface. Curve 410 is a binary response. At low z (i.e., when the touch has not yet disturbed the beam), the transmittance Tjk is at its maximum. However, at some point $z_0$, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths will be shown unfolded for clarity. Thus, sources, optical beams and sensors will be shown as lying in one plane. In actual implementations, the sources and sensors typically will not lie in the same plane as the optical beams. Various coupling approaches can be used. A planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Application Ser. No. 61/510,989 "Optical Coupler" filed on Jul. 22, 2011, which is incorporated by reference in its entirety herein.

D. Optical Beam Paths

Figures 5A, 5B, 5C:
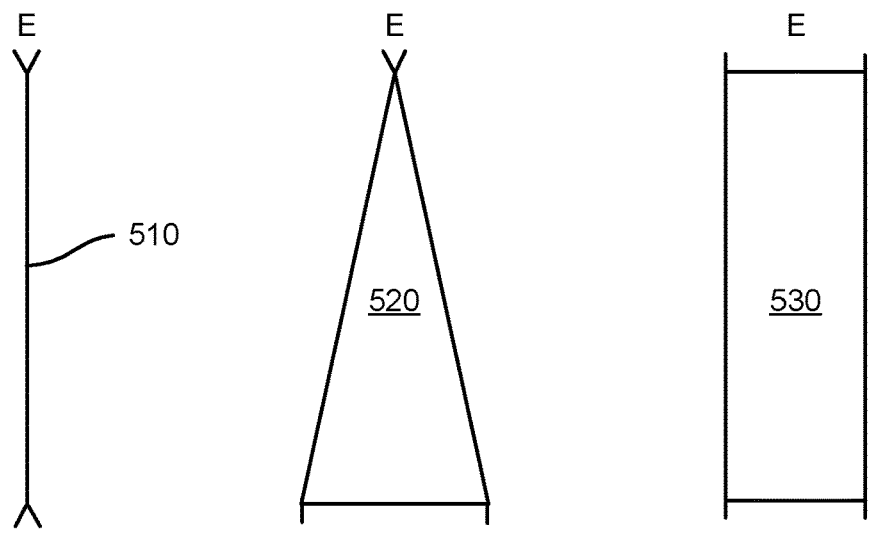
FIGS. 5A-5C are top views of differently shaped beam footprints.

Another aspect of a touch-sensitive system is the shape and location of the optical beams and beam paths. In FIGS. 1-2, the optical beams are shown as lines. These lines should be interpreted as representative of the beams, but the beams themselves are not necessarily narrow pencil beams. FIGS. 5A-5C illustrate different beam shapes.

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
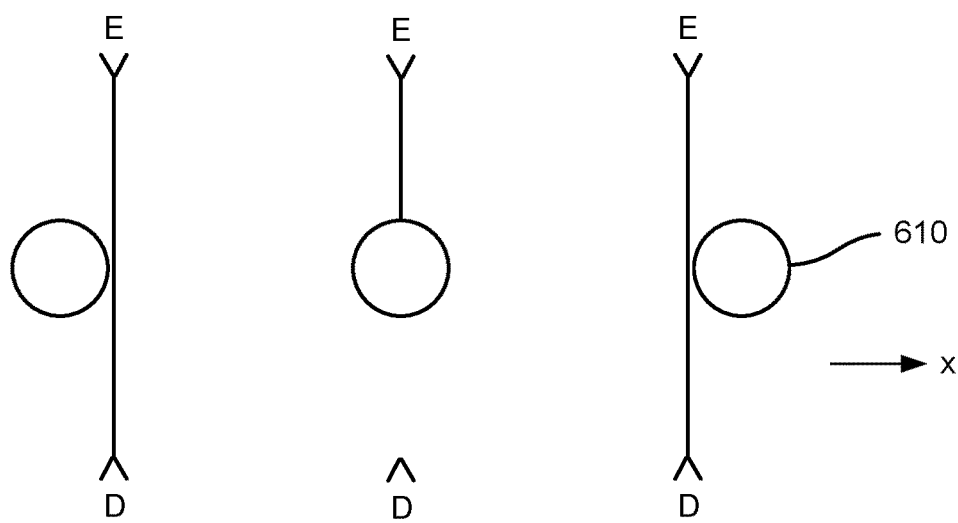
FIGS. 6A-6B are top views illustrating a touch point travelling through a narrow beam and a wide beam, respectively.
Figure 6B:
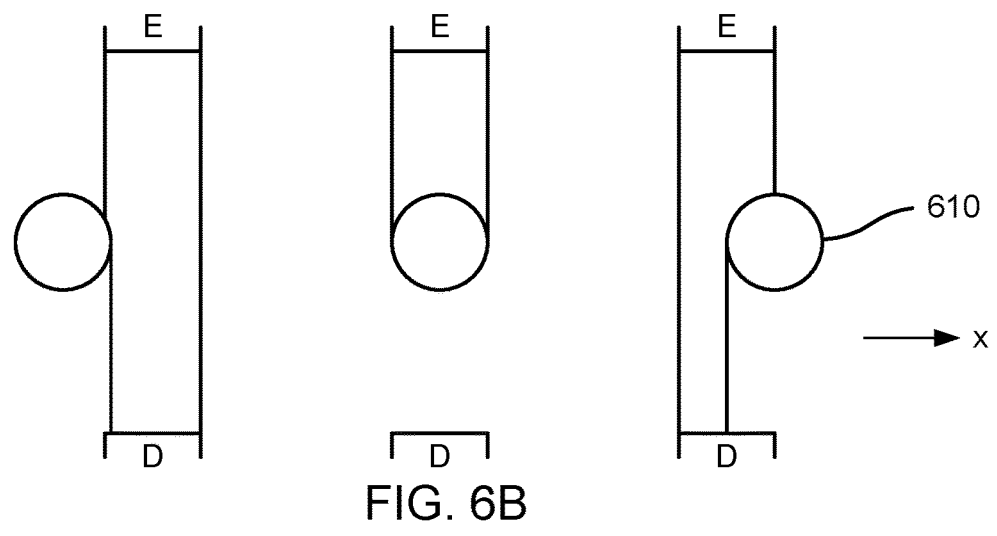
Figure 7:
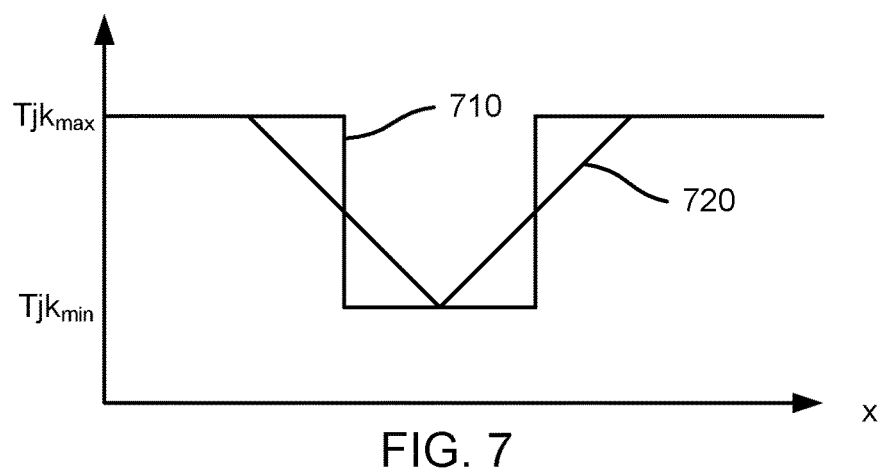
FIG. 7 are graphs of the binary and analog responses for the narrow and wide beams of FIG. 6.

FIGS. 6A-6B and 7 show how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

FIGS. 5-7 consider an individual beam path. In most implementations, each emitter and each detector will support multiple beam paths.

Figure 8A:
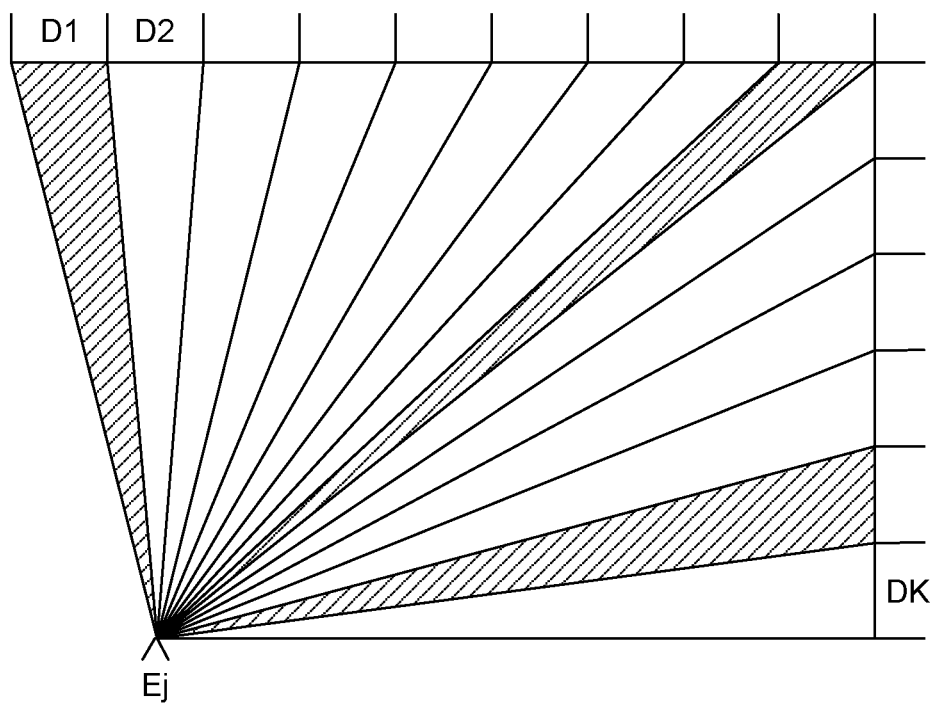
FIGS. 8A-8B are top views illustrating active area coverage by emitters.
Figure 8B:
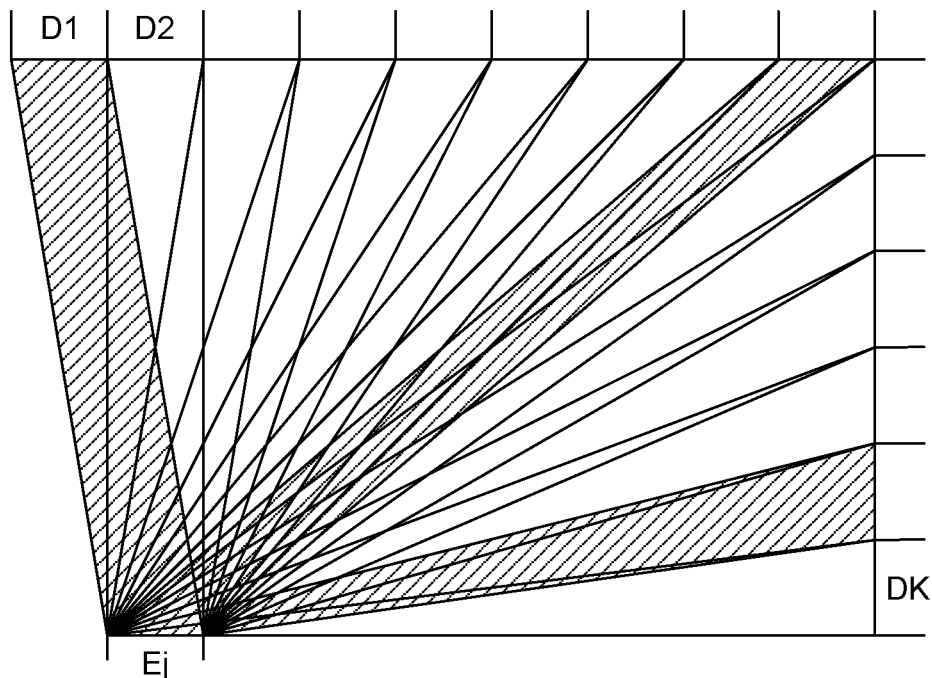

FIG. 8A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but we will refer to them as rectangular). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors) and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

The discussion above for emitters also holds for detectors. The diagrams constructed for emitters in FIGS. 8A-8B can also be constructed for detectors. A detector Dk's coverage area is then the aggregate of all footprints for beams received by a detector Dk. The aggregate of all detector coverage areas gives the overall system coverage.

E. Active Area Coverage

The coverage of the active area 131 depends on the shapes of the beam paths, but also depends on the arrangement of emitters and detectors. In most applications, the active area is rectangular in shape, and the emitters and detectors are located along the four edges of the rectangle.

Figure 8C:
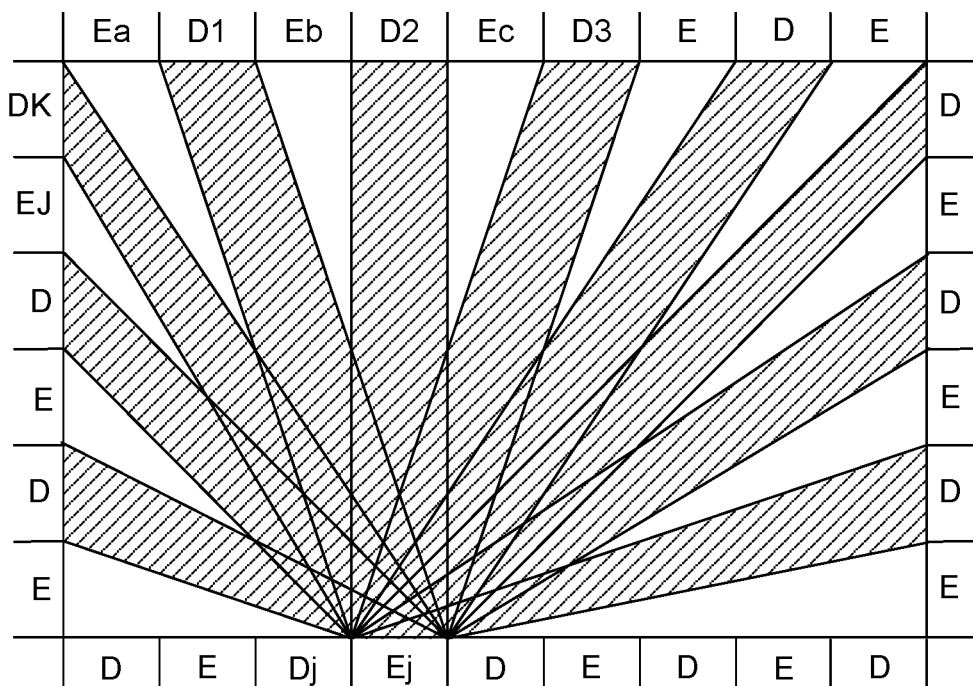
FIG. 8C is a top view illustrating alternating emitters and detectors.

In a preferred approach, rather than having only emitters along certain edges and only detectors along the other edges, emitters and detectors are interleaved along the edges. FIG. 8C shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. application Ser. No. 13/059,772 "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller must cycle through the emitters quickly enough to meet the required touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are used to determine the locations of touch points. Different approaches and techniques can be used, including candidate touch points, line imaging, location interpolation, touch event templates, multi-pass processing and beam weighting.

A. Candidate Touch Points

One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points. This approach is described in further detail in U.S. patent application Ser. No. 13/059,817, "Method and Apparatus for Detecting a Multitouch Event in an Optical Touch-Sensitive Device," which is incorporated herein by reference.

B. Line Imaging, Tomography

This technique is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location. These line images can be processed to reconstruct the touch points, for example by using correlation or tomography principles. This approach is described in further detail in U.S. patent application Ser. No. 13/460,703, "Detecting Multitouch Events in an Optical Touch-Sensitive Device using Touch Event Templates," and Ser. No. 14/092,850, "Optical Touch Tomography," which are incorporated herein by reference.

C. Location Interpolation

Applications typically will require a certain level of accuracy in locating touch points. One approach to increase accuracy is to increase the density of emitters, detectors and beam paths so that a small change in the location of the touch point will interrupt different beams. Another approach is to interpolate between beams. This approach is described in further detail in U.S. patent application Ser. No. 13/460,703, "Detecting Multitouch Events in an Optical Touch-Sensitive Device using Touch Event Templates," which is incorporated herein by reference.

D. Touch Event Templates

If the locations and shapes of the beam paths are known, which is typically the case for systems with fixed emitters, detectors and optics, it is possible to predict in advance the transmission coefficients for a given touch event. Templates can be generated a priori for expected touch events. The determination of touch events then becomes a template matching problem.

If a brute force approach is used, then one template can be generated for each possible touch event. However, this can result in a large number of templates. For example, assume that one class of touch events is modeled as oval contact areas and assume that the beams are pencil beams that are either fully blocked or fully unblocked. This class of touch events can be parameterized as a function of five dimensions: length of major axis, length of minor axis, orientation of major axis, x location within the active area and y location within the active area. A brute force exhaustive set of templates covering this class of touch events must span these five dimensions. In addition, the template itself may have a large number of elements.

Thus, in another approach, the set of templates is simplified. For example, one possible template for a touch event with a certain contact area is the set of all beam paths that would be affected by the touch. However, this is a large number of beam paths, so template matching will be more difficult. In addition, this template is very specific to contact area. If the contact area changes slightly in size, shape or position, the template for contact area will no longer match exactly. Also, if additional touches are present elsewhere in the active area, the template will not match the detected data well. Thus, although using all possible beam paths can produce a fairly discriminating template, it can also be computationally intensive to implement. An alternative uses templates with less than all affected beams. For example, a simpler template may be based on only four beams that would be interrupted by a certain contact area. This is a less specific template since other contact areas of slightly different shape, size or location will still match this template. This is good in the sense that fewer templates will be required to cover the space of possible contact areas. This template is less precise than the full template based on all interrupted beams. However, it is also faster to match due to the smaller size. These types of templates often are sparse relative to the full set of possible transmission coefficients.

Note that a series of templates could be defined for a certain contact area, increasing in the number of beams contained in the template: a 2-beam template, a 4-beam template, etc. In one embodiment, the beams that are interrupted by contact area are ordered sequentially from 1 to N. An n-beam template can then be constructed by selecting the first n beams in the order. Generally speaking, beams that are spatially or angularly diverse tend to yield better templates. That is, a template with three beams running at 60 degrees to each other and not intersecting at a common point tends to produce a more robust template than one based on three largely parallel beams which are in close proximity to each other. In addition, more beams tends to increase the effective signal-to-noise ratio of the template matching, particularly if the beams are from different emitters and detectors.

Often, a base template can also be used to generate a family of similar templates. For example, contact area B may be is the same as contact area A, but shifted to the right. The corresponding four-beam template for contact area B can then be generated from the template for contact area A, by making use of the right shift. More generally, the template for contact area A can be abstracted or parameterized (e.g., where the parameters are the amount of shift in different directions). The abstraction will be referred to as a template model. In one approach, the model is used to generate the individual templates and the actual data is matched against each of the individual templates. In another approach, the data is matched against the template model. The matching process then includes determining whether there is a match against the template model and, if so, which value of the parameters produces the match.

Templates can use both positive and negative regions. An actual contact area may be surrounded by a "touch-free" zone. If contact is made in the actual contact area, then there will be no contact in the immediately surrounding area. Thus, the template includes both (a) beams in the contact area that are interrupted, and (b) beams in the shaded area that are not interrupted.

Templates can also be based both on reduced and enhanced transmission coefficients. For a particular type of contact, the transmission coefficients for certain beams that are interrupted should decrease. However, the touch interaction may scatter or reflect light in other directions, and the transmission coefficients for these directions should increase.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

Additional examples of touch event templates are described in further detail in U.S. patent application Ser. No. 13/460,703, "Detecting Multitouch Events in an Optical Touch-Sensitive Device using Touch Event Templates," which is incorporated herein by reference.

E. Multi-Pass Processing

Referring to FIG. 2, the processing phase need not be a single-pass process nor is it limited to a single technique. Multiple processing techniques may be combined or otherwise used together to determine the locations of touch events.

As one example, a first stage is a coarse pass that relies on a fast binary template matching. In this stage, the templates are binary and the transmittances T'jk are also assumed to be binary. The binary transmittances T'jk can be generated from the analog values Tjk by rounding or thresholding the analog values. The binary values T'jk are matched against binary templates to produce a preliminary list of candidate touch points. Some clean-up is performed to refine this list. For example, it may be simple to eliminate redundant candidate touch points or to combine candidate touch points that are close or similar to each other. A second stage is used to eliminate false positives, using a more refined approach. For each candidate touch point, neighboring beams may be used to validate or eliminate the candidate as an actual touch point. The techniques described in U.S. patent application Ser. No. 13/059,817 may be used for this purpose. This stage may also use the analog values Tjk, in addition to accounting for the actual width of the optical beams. The output of stage is a list of confirmed touch points. The final stage refines the location of each touch point. For example, the interpolation techniques described previously can be used to determine the locations with better accuracy. Since the approximate location is already known, stage may work with a much smaller number of beams (i.e., those in the local vicinity) but might apply more intensive computations to that data. The end result is a determination of the touch locations.

Other techniques may also be used for multi-pass processing. For example, line images or touch event models may also be used. Alternatively, the same technique may be used more than once or in an iterative fashion. For example, low resolution templates may be used first to determine a set of candidate touch locations, and then higher resolution templates or touch event models may be used to more precisely determine the precise location and shape of the touch.

F. Beam Weighting

In processing the transmission coefficients, it is common to weight or to prioritize the transmission coefficients. Weighting effectively means that some beams are more important than others. Weightings may be determined during processing as needed, or they may be predetermined and retrieved from lookup tables or lists.

One factor for weighting beams is angular diversity. Usually, angularly diverse beams are given a higher weight than beams with comparatively less angular diversity. Given one beam, a second beam with small angular diversity (i.e., roughly parallel to the first beam) may be weighted lower because it provides relatively little additional information about the location of the touch event beyond what the first beam provides. Conversely, a second beam which has a high angular diversity relative to the first beam may be given a higher weight in determining where along the first beam the touch point occurs.

Another factor for weighting beams is position difference between the emitters and/or detectors of the beams (i.e., spatial diversity). Usually, greater spatial diversity is given a higher weight since it represents "more" information compared to what is already available.

Another possible factor for weighting beams is the density of beams. If there are many beams traversing a region of the active area, then each beam is just one of many and any individual beam is less important and may be weighted less. Conversely, if there are few beams traversing a region of the active area, then each of those beams is more significant in the information that it carries and may be weighted more.

In another aspect, the nominal beam transmittance (i.e., the transmittance in the absence of a touch event) could be used to weight beams. Beams with higher nominal transmittance can be considered to be more "trustworthy" than those which have lower nominal transmittance since those are more vulnerable to noise. A signal-to-noise ratio, if available, can be used in a similar fashion to weight beams. Beams with higher signal-to-noise ratio may be considered to be more "trustworthy" and given higher weight.

The weightings, however determined, can be used in the calculation of a figure of merit (confidence) of a given template associated with a possible touch location. Beam transmittance/signal-to-noise ratio can also be used in the interpolation process, being gathered into a single measurement of confidence associated with the interpolated line derived from a given touch shadow in a line image. Those interpolated lines which are derived from a shadow composed of "trustworthy" beams can be given greater weight in the determination of the final touch point location than those which are derived from dubious beam data.

Part B: Instrument Detection

IV. Introduction

Detection of a pen, stylus or other instrument touch as distinct from a finger touch is an important attribute for many applications. In some applications, simple detection of an instrument touch event may be sufficient. Other applications may also require the ability to distinguish between different types of instruments.

Although separate mechanisms can be used to support instrument touch detection, it is preferable for an optical touch-sensitive device to be able to provide these features with little or no hardware modification. Instruments can broadly be categorized as either passive or active. Passive instruments interact with the optical beams transmitted between emitters and detectors but do not add energy. Active instruments may add energy and may contain their own emitter(s) and detector(s). Active instruments may be battery powered and typically will also contain another communications channel, for example a wireless connection, in order to coordinate their operation with the rest of the optical touch detection system. One advantage of instruments compared to fingers, is that the instrument, and specifically its tip, can be designed to achieve a specific touch interaction with the optical beams. Different instruments can be designed to implement different touch interactions, and they can then be distinguished on that basis.

At least two classifications of data are available in an optical touch detection system for detecting instrument touches: beam data and cell data. Beam data relates to the attenuation experienced by the optical beams in the system. It should be noted that the attenuation for some beams under a touch can be negative (i.e., there is increased optical transmission) under certain circumstances, typically where there is reflection or scattering. Cell data relates to small areas (typically a few millimeters across) on the touch-sensitive surface where the attenuation values for beams passing through each of these areas is aggregated to give an indication of the localized activity in the area of the cell. The whole touch-sensitive surface is divided into cells.

In some cases, finger, palm and instrument contacts may all be present simultaneously on the touch-sensitive surface. In order to discriminate between instrument and other contacts, and between instrument identities (there may be more than one instrument associated with the system), each contact area can be analyzed.

V. Passive Instrument Detection

Instruments can be designed so that their touch interactions are uniquely identifiable. Some features are more reliable than others, some more rapidly detectable than others and some more easily implemented than others. In practice, more than one feature may be used to provide improved instrument detection and/or identification. Example features include: (A) contact area, (B) contact absorption rate over distance/area, (C) contact landing behavior over time, (D) pattern of absorption against beam angle, (E) pattern of reflection against beam angle, (F) ratio of reflection to attenuation, (G) wavelength-selective behavior, (H) refractive index of contact material, (I) birefringence of contact material, and/or (J) re-emission of received energy. These features can each be used to detect instrument touches and also to distinguish instrument touches from other types of touches (e.g., finger touches) and to distinguish between different types of instruments.

A. Contact Area

Figure 9A:
FIGS. 9A-9E are top views of different types of two-dimensional contact areas for instruments.
Figure 9B:
Figure 9C:
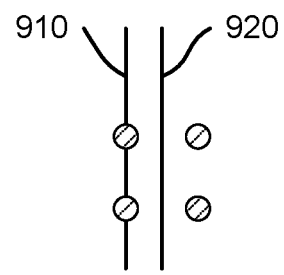
Figure 9D:
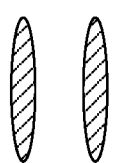
Figure 9E:
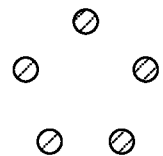

The contact area may be used to distinguish an instrument touch from another type of touch (e.g., a finger touch or touch by a different instrument). Because the instrument can be designed, there are more degrees of freedom to the contact area compared to a human finger. Contact area can be designed to differ in size and shape. Instruments, such as ordinary pens or styluses, typically have a tip that is smaller than a human finger and can be distinguished on that basis. FIGS. 9A-9E are top views of different types of two-dimensional contact areas for instruments. FIG. 9A shows a contact area for an instrument with a small tip. The size alone may be used to distinguish this instrument from human fingers. FIG. 9B shows an asymmetric contact area, in this example an elongated ellipse. The different behaviors in the x and y directions can be used to identify this instrument, because human fingers typically have a more circular contact area and so are more isotropic in their touch interactions. FIGS. 9C-9E show contact areas that include multiple disjoint regions. In FIG. 9C, the contact area is a 2×2 array of contact regions. In this example, optical beams, such as beam 910, that hit the contact regions will be attenuated but optical beams, such as beam 920, that pass between the contact regions will not be affected. Movement of the instrument may enhance this effect, making it easier to detect. FIG. 9D is a one-dimensional version of the contact area of FIG. 9C. This also allows some determination of the orientation of the instrument. FIG. 9E is a version where the contact regions are not on a rectilinear grid. Because the instrument is manufactured, the individual features such as the individual contact regions can be made smaller and more precise than the features on a human finger.

B. Attenuation Rate

Although finger touches can give rise to a range of beam attenuation values, there is generally a maximum realizable attenuation rate per unit distance (the length of a beam which is underneath the contact) or per unit area that a finger can achieve. Instruments can be designed using materials and/or structures that have a significantly higher rate of attenuation. When detected, this can form a strong indication of a touch by a specially devised instrument tip.

The rate of attenuation for the size of the contact is determined based on an estimate of the contact size to be provided. Such an estimate is available from analysis of the beam data associated with the contact being assessed (for example, by counting the number of beams in the vicinity of the contact which are showing attenuation).

Once the size (and possibly also the shape) of the contact area is known, a geometric analysis can be used to estimate the path under the contact for each beam in the area. From this, the length of the path under the contact for each affected beam can be estimated and combined with the attenuation data for the beams to give an indication of the loss per unit distance travelled under the touch as an alternative to loss over the contact area. Both methods can give somewhat similar results.

Note that a measurement of attenuation rate for touch types other than instruments could also be useful, for example to detect when a finger may have a contaminant on it. This could be used to enable particular software or hardware mechanisms to optimize performance in the presence of contamination.

Regarding distinguishing between multiple instrument identities, mechanical or chemical modification of the instrument tip material can enable a range of attenuation rates to be achieved. The measured attenuation rate for an instrument touch could be used to determine the identity of the contacting instrument.

C. Touch Interaction over Time

Instruments can also be designed to have a different temporal behavior than fingers or other instruments. FIG. 10A shows a finger touch progressing in time. The finger touch at time t1 initially shows a small contact area, perhaps consistent in size with an instrument tip, but the contact area typically increases in size rapidly as the finger "lands" on the waveguide, as shown at time t2 and t3. This behavior over a very short period of time forms another distinguishing feature allowing finger touches to be recognized.

If an instrument is rigid, then it will make contact much more quickly as shown in FIG. 10B. At time t1, the instrument makes contact with the waveguide and it remains with the same contact area from then on. In FIG. 10C, the instrument is rigid and has some small amount of bouncing at time t2 before settling to its final position at time t3. All of these behaviors are different than the finger touch shown in FIG. 10A. Discerning different touch types typically requires not more than a few milliseconds.

D. Touch Interaction that Varies as a Function of Beam Direction

Finger touches are reasonably isotropic with respect to how much attenuation they introduce as a function of the direction of the interrupted beam. However, an intentionally structured instrument tip can show pronounced variations in attenuation as a function of the direction of the sensing beams. The instrument response will rotate with the instrument tip, so the detection mechanism should be capable of identifying the designated response at any arbitrary orientation. Conversely, the detection process can yield information about the orientation of the instrument.

Figure 11:
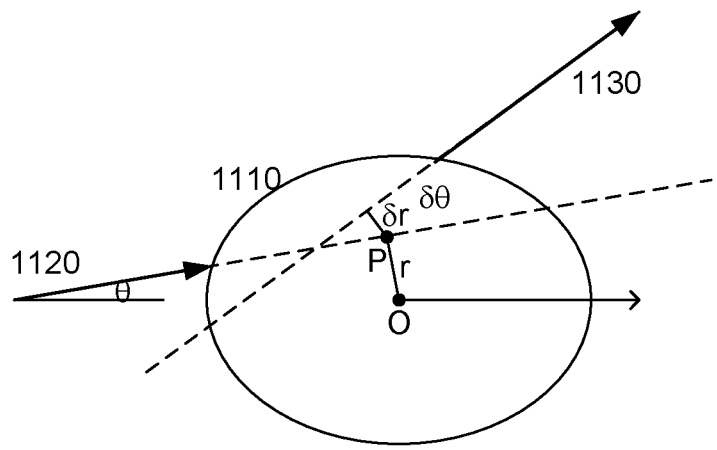
FIG. 11 is a diagram of nomenclature used to define an instrument response.

FIG. 11 is a diagram of nomenclature used to define an instrument response. An origin O and a 0 angle direction, denoted by the arrow, are defined with respect to the contact area 1110 of the instrument. For example, the origin O may be the center of the contact area, and the 0 angle may be chosen arbitrarily. An incoming optical beam 1120 is defined by coordinates $(r,\theta)$, where r is the offset of the path of the incoming beam 1120 relative to the origin (i.e., the length of segment OP) and $\theta$ is the direction of propagation of the incoming beam. An outgoing optical beam 1130 is defined by coordinates $(\delta r, \delta\theta)$ relative to point P on the incoming beam 1120. The propagation direction for the outgoing optical beam 1130 is $\delta\theta$ relative to the incoming beam 1120, or $(\theta+\delta\theta)$ relative to the 0 angle. The outgoing beam 1130 is also offset by $\delta r$ relative to point P of the incoming beam. The offset relative to the origin O is not necessarily $(r+\delta r)$, as can be seen from FIG. 11. On outgoing beam with $(\delta r=0, \delta\theta=0)$ is collinear with the incoming beam, outgoing beams with $(\delta r=0)$ all have paths through point P, and outgoing beams with $(\delta\theta=0)$ are all parallel to the incoming beam. The instrument's response can then be defined by the transmission function $H(r, \theta, \delta r, \delta\theta)$, which is the strength of an outgoing beam 1130 $(\delta r, \delta\theta)$ produced by an incoming beam 1120 $(r,\theta)$. For convenience, the transmission function can be normalized so that $H=1$ means that the outgoing beam 1130 has the same strength as the incoming beam 1120.

For "ideal" fingers, the contact area 1110 is circular, and the transmission function H exhibits some symmetries. For example, the transmission function H is independent of incoming beam direction $\theta$. Also, due to symmetry, $H(r, \delta r, \delta\theta)=H(-r, -\delta r, -\delta\theta)$. Typically, the transmission function H is monotonically decreasing for increasing values of $|\delta r|$ and $|\delta\theta|$, i.e., for increasing offsets and increasing angular deviations of the outgoing beam. However, instruments can be designed specifically to violate any of these characteristics for ideal fingers. For example, consider the contact areas shown previously in FIGS. 9B-9E. None of these has a transmission function H that is independent of incoming beam direction $\theta$.

The complicated contact area shapes in FIGS. 9B-9E can be implemented by creating an instrument tip where the individual contact regions couple light out of the waveguide of the touch-sensitive device (frustrated TIR) and the non-contact regions do not. For example, the contact regions may be constructed from a transparent material with an index of refraction that matches the waveguide, so that light propagating in the waveguide passes into the material and then is absorbed or redirected elsewhere. The non-contact regions may be constructed of reflective materials to confine light to the underlying waveguide, or may be constructed with an air gap so that total internal reflection is not frustrated.

Figures 12A, 12B:
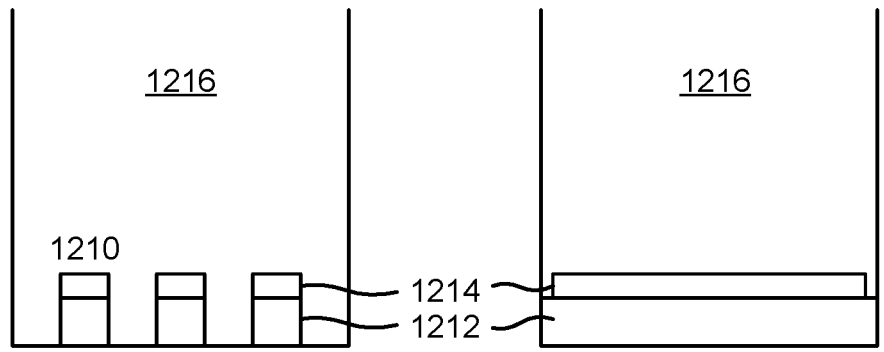
FIGS. 12A-12B are a front view and a side cross-sectional view of a tip structure using internal waveguide channels.

FIG. 12A is a front view of a more complicated tip structure. This tip structure includes a number of parallel waveguide channels 1210. FIG. 12B is a side cross-sectional view through the center of a waveguide channel 1210. Each waveguide channel 1210 is a strip of transparent material 1212 capped by an air gap 1214. The transparent material 1212 in this example has a matching refractive index to the waveguide of the touch-sensitive device. Materials of other indices of refraction can also be used. A higher index of refraction can shorten the travel distance of beams within the tip, thus allowing the tip to be made smaller. The rest of the tip is constructed from a material 1216. The material 1216 can be reflective or absorptive, which will produce different but distinctive instrument responses.

Figure 12C:
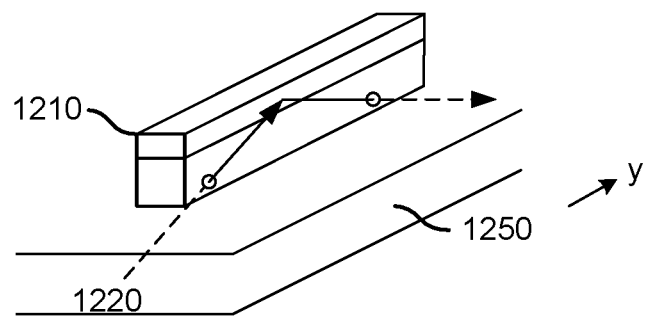
FIG. 12C illustrates operation of the tip structure in FIGS. 12A-12B.

This tip offers selective reflection behavior that depends on the direction of the incident beam. FIG. 12C shows operation of a single waveguide channel 1210. Light ray 1220 is travelling along the +y direction, parallel to the waveguide channel 1210 which is also oriented along the y direction. As a result, light 1220 couples into the waveguide channel 1210. In FIG. 12C, the ray 1220 is shown as dashed when traveling in the underlying waveguide 1250 and solid when traveling in the waveguide channel 1210. The circle indicates the point of entry or exit from the waveguide channel 1210. The light 1220 experiences total internal reflection within the waveguide channel 1210 before coupling back to the underlying waveguide 1250.

Light rays that are propagating off-parallel relative to the orientation of the waveguide channel 1210 (e.g., at small angles relative to the y direction) will couple less efficiently. For example, a beam traveling along the x direction (perpendicular to the waveguide channel) may enter one or more of the waveguide channels, but will strike the side wall of the channel because the channels are not as wide as they are long. That ray will either be absorbed or reflected in large part by that side wall, depending on whether the side wall material is absorptive or reflective. This different behavior for rays propagating in the x and y directions yields a distinctive instrument response. This tip acts as a sort of directional filter, since the transmission function $H(r, \theta, \delta r, \delta\theta)$ is concentrated along certain preferred directions $\theta$.

In addition to designing different patterns of attenuation, instruments can also be constructed to redirect incident light on paths other than those which would occur by propagation through the waveguide. An instrument tip of this type typically will include some reflective elements. As a result of such an instrument tip being in contact with the sensing waveguide, optical transmission will be reduced on some optical paths and increased on others. This is not a pattern that would normally occur with fingers, for example.

Figure 13:
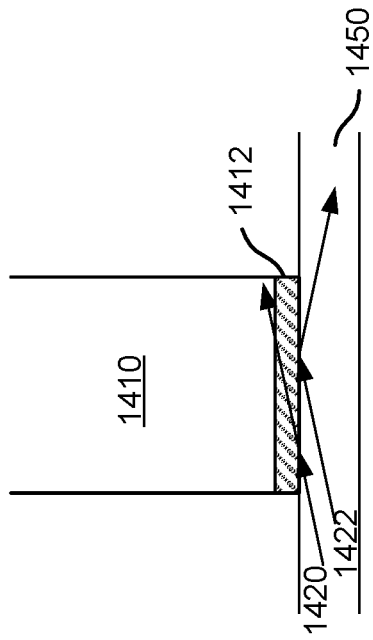
FIG. 13 is a diagram of a tip structure that redirects light.

FIG. 13 is an example of an instrument tip that uses a prism 1310 to redirect light. In FIG. 13, the prism 1310 is represented by its base 1312 and two surfaces 1314 and 1316. The full prism is not drawn in FIG. 13 for clarity. In this example, the prism 1310 is constructed of a transparent material that is index matched to the underlying waveguide 1350 (although index matching is not required). Light ray 1320 is propagating along the +y direction in the waveguide and couples into the prism 1310 through its base 1312. The ray reflects off the two sides 1314, 1316, which are coated with reflective material. In some designs, the reflection may be the result of total internal reflection. The exiting light ray 1322 is redirected to the +x direction and at an angle that supports total internal reflection within the waveguide 1350. The re-routing of light can also be accomplished using other elements, such as retroreflectors, fibers, light pipes or waveguides. Gratings or other beamsplitting elements can be used to create multiple exit optical beams.

The transmission function H can be used in different ways to identify instrument touches and to distinguish different instruments. For example, many transmission functions are characterized by certain directions that exhibit strong attenuation or strong enhancement. That characteristic can be used to detect and identify instruments. The ratio of attenuated and enhanced beams can also be used. If there are multiple output beams, the number of beams with greater than a certain strength could be used.

As a further variation, the transmission function for an instrument may also depend on the orientation of the instrument. The instrument tip in FIG. 12 has a flat bottom, which is intended to be flush against the touch-sensitive surface. If the instrument is tilted, the bottom will not make the same contact and the transmission behavior will be different. Mathematically, the transmission function can be described as $H(r, \theta, \delta r, \delta\theta, \alpha, \beta)$ where $\alpha, \beta$ define the orientation of the instrument relative to the touch-sensitive surface. In some instruments, the transmission function is intended to be independent of the orientation $\alpha, \beta$. Instruments with rounded tips help to facilitate this behavior because at least the physical contact will be the same—a rounded tip against a flat touch-sensitive surface—regardless of the orientation of the instrument. Alternatively, the instrument can be intentionally designed to have a transmission function $H(r, \theta, \delta r, \delta\theta, \alpha, \beta)$ that varies as a function of the instrument orientation $\alpha, \beta$.

Regarding distinguishing between multiple instruments, since many beams are affected by an instrument touch, this allow the transmission functions of different instruments to contain unique features to be identified. The processing workload associated with instrument identification will be strongly dependent on the number of different instruments to be identified. Also, other touches may occur simultaneously with one or more instrument touches, so reasonably complex transmission functions are preferred to provide robust identification.

E. Wavelength-Selective Touch Interaction

Wavelength can be used to add another dimension to touch interactions. This can allow touches to be assessed in a way which will readily distinguish an instrument tip which has spectral properties, such as narrowband absorption or reflection properties. Different wavelengths can be implemented at the emitter by using different emitter types or by selective use of optical filtering materials in the emitter couplers (to modify the limited spectrum generated by a single broadband LED type). Detectors are typically sensitive over a wide range of wavelengths, so energy from various emitter wavelengths can be detected. Note that the proportion of emitters operating at one wavelength relative to those operating at other wavelengths could be small or additional emitters provided specifically to aid with identification. An extension of this scheme would be to use emitters with visible wavelengths to detect the color of the contacting material. This kind of color detection could, for example, be used in drawing applications, where the color of the contacting material could be applied to the path traced by the contact. Alternately, broadband emitters could be used, with wavelength selectivity implemented at the detector. Detectors sensitive at different wavelengths could be used, or optical filters could be used with broader band detectors.

Regarding distinguishing between different instruments, in one implementation, one instrument might absorb (e.g., cause attenuation due to frustrated TIR) at a first wavelength but not at a second wavelength, while a different instrument absorbs at the second wavelength but not the first. Alternatively, instruments could be distinguished based on ratios of attenuation at different wavelengths. This could be extended to more than just two wavelengths.

Figure 14:
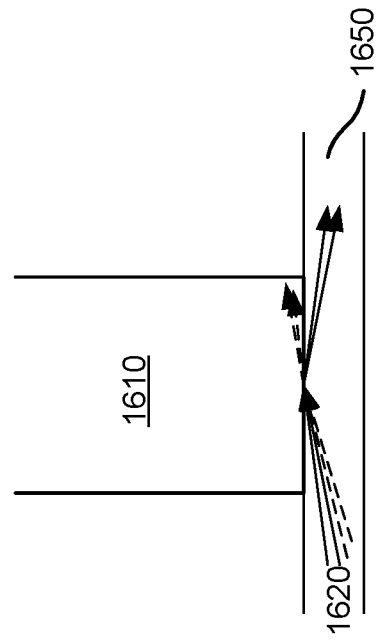
FIG. 14 is a diagram of a wavelength-selective tip structure.

FIG. 14 is a diagram of an instrument tip that attenuates over a narrow wavelength band. The tip includes transparent material 1410 with a matching index of refraction to the underlying waveguide 1450 (although index matching is not required). The tip also includes a narrowband spectral filter 1412, which passes wavelengths in a narrow passband centered at $\lambda_0$. Light ray 1420 is at wavelength $\lambda_0$, passes through the wavelength filter 1412, enters material 1410 and then is absorbed or otherwise prevented from reentering the waveguide 1450. Light ray 1422 is at a wavelength $\lambda_0$ that is outside the passband. This ray 1422 is reflected by the wavelength filter 1412 and remains in the waveguide 1450. In an alternate approach, the wavelength filter 1412 could block a wavelength band rather than transmitting a wavelength band.

Figure 15:
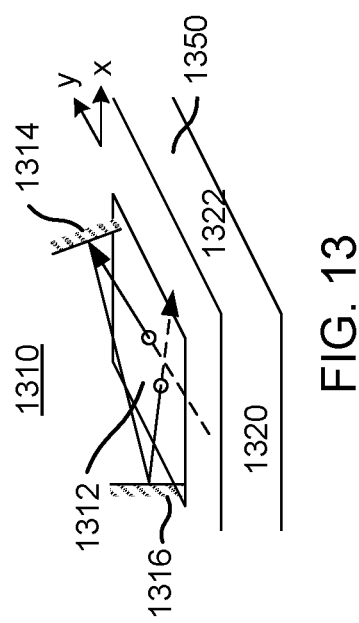
FIG. 15 is a diagram of a tip structure using a grating.

FIG. 15 is a diagram of an instrument tip 1510 that uses a grating 1512. Light ray 1520 is at a shorter wavelength and light ray 1522 is at a longer wavelength. Both rays are diffracted into the first diffraction order. However, the angle of diffraction is greater for the light ray 1522 of longer wavelength. The diffracted ray 1520 still propagates at an incidence angle that is beyond the critical angle and remains confined within the waveguide 1550. However, the diffracted ray 1522 now propagates at an incidence angle that is less than the critical angle. Total internal reflection is lost and the optical beam 1522 is attenuated. The angle of diffraction and resulting wavelength behavior can be varied by changing the period of the grating and/or the efficiency of coupling into different diffraction orders.

F. Index of Refraction, Birefringence

Instruments can be constructed using materials with different indices of refraction, including birefringent materials. They can then be distinguished on this basis. The critical angle at an interface depends on the indices of refraction of the materials on both sides of the interface. Changing the index of refraction of the instrument tip changes the critical angle, which in turn affects whether an optical beam is transmitted into the instrument tip (i.e., removed from the waveguide) or total internally reflected back into the waveguide. If the optical beam includes a distribution of rays at different angles of incidence, then some may be transmitted and some reflected so that the aggregate attenuation of the instrument is between 0 and 1. Different angles of incidence can be provided by different coupler profiles. Synthetic materials can be produced with a very wide range of refractive indices.

Figure 16:
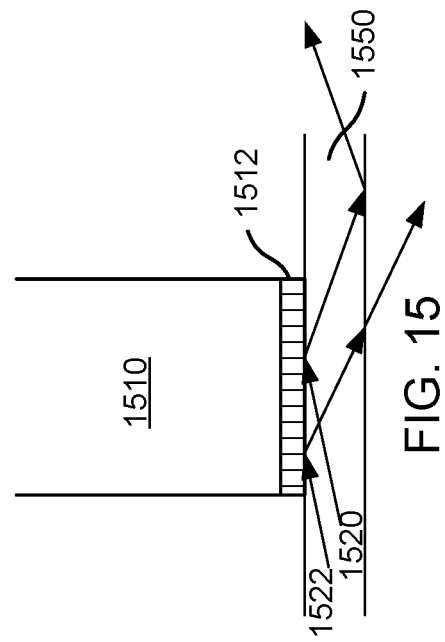
FIG. 16 is a diagram of a tip structure with an intermediate index of refraction.

FIG. 16 is a diagram of a tip 1610 with an index of refraction between air and that of the underlying waveguide 1650. The incoming beam 1620 includes rays propagating across a distribution of propagation angles. For clarity, FIG. 16 shows only four angles, two of which are shown by solid lines and two by dashed lines. All of these rays are beyond the critical angle so they experience total internal reflection at sections of the waveguide 1650 which border air (i.e., where there is no touch). The instrument 1610 has a higher index of refraction so some of the steeper rays (dashed lines) couple into the instrument, which appears as attenuation at the detectors. Shallower rays (solid lines) are still beyond the critical angle for the interface with the instrument, so they are reflected at the interface and continue propagating within the waveguide 1650. By changing the index of refraction, the percentage of rays transmitted at the interface and the overall attenuation can be adjusted. Birefringent materials can be used to construct instruments with even more complex transmission functions, since the index of refraction varies as a function of polarization and angle of propagation.

G. Re-Emission of Light

Photoluminescence is not present for finger touches but can be achieved by some synthetic materials. Fluorescence involves a spectral shift between the received and emitted energy. Phosphorescence does not necessarily have a spectral shift, but does introduce a time lag between reception and emission and may also include a change in propagation direction. Detection of the temporal "smearing" of the sensing energy would be readily detectable. Different chemistries can also provide widely different time constants.

VI. Active Instrument Detection

Actively powered instruments (active instruments) can provide additional capabilities. An active instrument may use solely optical input/output to operate in conjunction with the optical touch-sensitive device, or may have a wireless or other communications link with which to communicate data to the touch-sensitive device. The instrument tip may include optical emitter(s) for light injection into the underlying waveguide, optical detector(s) for light extraction from the waveguide, or both optical detector(s) and optical emitter(s). Instruments with emitter(s) will be referred to as injector instruments and those with detector(s) will be referred to as extractor instruments.

An active instrument can provide advantages, including possibly the following. (1) An active instrument can be designed to support different modes of operation. In addition, the mode might be selectable on the instrument itself (for example, the instrument color). (2) Adding active functionality increases the number of possible designs, thus allowing a larger number of possible instrument identities to be distinguished. (3) Additional buttons and other user controls can be added to active instruments. (4) Force measurement and reporting can be added. (5) The instrument orientation, position, movement, etc. can be sensed and reported, for example by using accelerometers and gyroscopes. This can help improve the overall touch performance, especially when the instrument is moving fast. (6) Wireless connections can be implemented, which in turn can enable additional functions. For example, non-contact operations can be provided. Improved instrument tracking can be accomplished using supplementary data. Or advanced notice of imminent instrument activity can be provided.

Active instruments require a source of power. Batteries are one option, either replaceable batteries or rechargeable cells. Recharging might be done when the instrument is at rest in a holder.

A. Injector Instrument

Figure 17A:
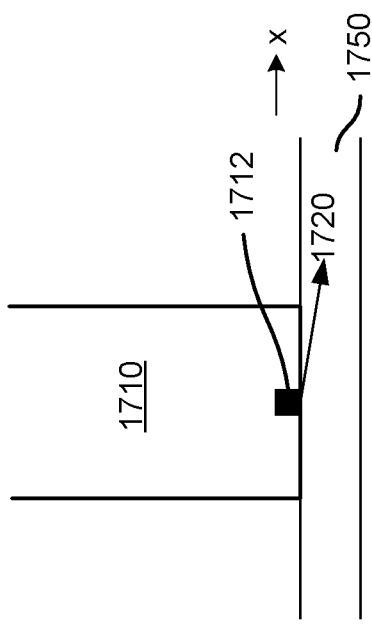
FIG. 17A is a side view of an injector tip.
Figure 17D:
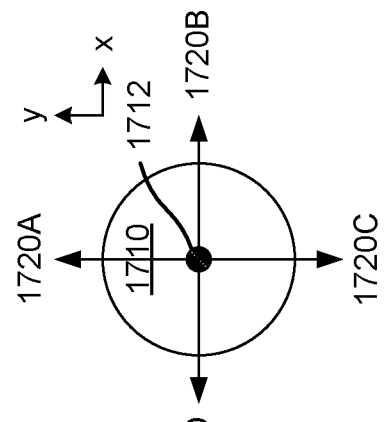
FIGS. 17B-17D are top view of different types of injector tips.
Figure 17C:
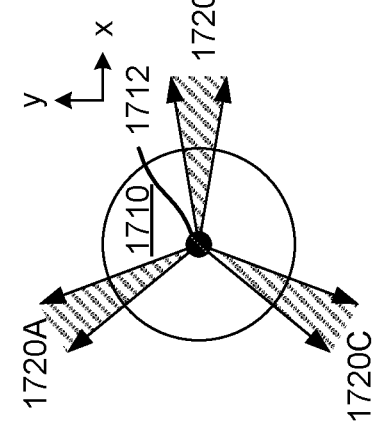
Figure 17B:
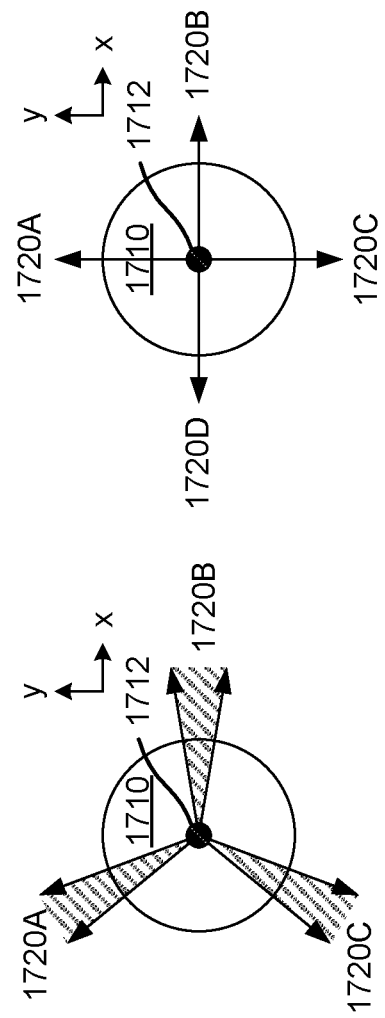

FIGS. 17A-17B are a side view and top view of an injector instrument 1710. The injector instrument 1710 houses an optical emitter 1712 that injects (modulated) light 1720 into the waveguide 1750, and that light 1720 can be detected by the detectors of the touch-sensitive system. In FIG. 17B, the instrument 1710 produces only a single optical beam 1720. The light 1720 from the instrument can be designed so that it is distinguishable from the optical beams produced by the emitters on the periphery of the device, for example by using different time slots, wavelengths and/or modulation. The optical beam 1720 from the instrument can be used for different purposes.

For example, the optical beam 1720 can be used as a communications channel and not at all for touch detection, which may be accomplished using optical beams as described above. The communicated data can include any information about the instrument: its identity, operational mode or operational parameters, contact force, position, orientation or motion, for example. The data can be encoded using standard methods, such as modulating the optical beam 1720. A single beam 1720 is sufficient as long as the beam can be detected by any detector on the periphery. If the position of the instrument is known by other means, then which detector(s) receives the optical beam 1720 can be used to determine the orientation (rotation) of the instrument.

The optical beam 1720 can also be used for touch detection. In FIG. 17B, if the single optical beam 1720 has characteristics that vary as a function of distance, for example if it is a fan-shaped beam so that the fraction of the beam intercepted by a detector decreases when the detector is farther away, then this can be used to assist in determining the touch location of the instrument.

In FIG. 17C. the instrument produces three fan-shaped beams 1720A-C. Distance from the instrument 1710 can be estimated based on the strength (or relative strengths) of the signals received by the detectors. This can then be used to triangulate the position of the instrument 1710. In FIG. 17D, the instrument produces four pencil beams 1720A-D, defining x and y directions relative to the instrument. The x-axis for the instrument can be estimated by a line connecting the detectors receiving optical beams 1720B and D, and the y-axis estimated by a line connecting the detectors receiving optical beams 1720A and C. The intersection of the x and y axes determines the touch location of the instrument 1710. These techniques can also be combined with the prior described techniques for determining touch events based on disturbing optical beams transmitted between emitters and detectors.

Regarding instrument identity, different instruments can be identified by having them emit different optical beams. Optical beams can use different wavelengths, time slots, frequency bands, encodings or modulations, etc. These can be used to distinguish different instruments.

B. Extractor Instrument

An instrument with a detector which detects optical beams from the underlying waveguide can implement various functions. First, the optical beam received can be used as a communications channel to transmit data from the rest of the touch-sensitive system to the instrument. In this case, the optical beam may or may not be one of the optical beams normally used for touch detection. In one approach, the optical beam is broadcast over a large area so that the instrument detector will receive the beam even if the position of the instrument is not known. In another approach, the position of the instrument is known and the optical beam is directed to that position.

An extractor instrument may also be used in touch detection. For example, the detector may be used to detect which optical beams from periphery emitters are received by the instrument. This information may be used to directly determine the position of the instrument, rather than or in addition to the prior described techniques for determining touch events based on disturbing optical beams transmitted between emitters and detectors.

C. Bidirectional Instruments

An instrument may contain both an emitter and a detector, in which case it is both an injector instrument and an extractor instrument. These instruments will be referred to as bidirectional instruments. There is more than one way in which such an instrument could interact with the touch-sensitive system. For example, it could simulate photoluminescence by emitting a delayed version of the signal received at the detector. Alternatively, the detector can be used to synchronize the emitter activity with that of the rest of the touch-sensitive system. The emitter and detector can also be used as a bidirectional communication channel for the transmission of data to/from the rest of the touch-sensitive system.

Regarding instrument identity, the coincident appearance of the instrument and the associated emitter modulation can provide information about the instrument identity. Also, the specific signal seen by the instrument detector can provide additional information regarding the approximate location of the instrument. Additional mode information from buttons and the like on the instrument can also be passed to the rest of the system.

D. Out of Band Communication Channel

Active instruments may have communication channels other than through the touch interaction, most likely wireless channels. The use of a wireless link provides ready support for many other features, such as mode selection and presentation control when not in contact with the touch-sensitive surface. Also, supplementary data from accelerometers, gyroscopes and other sensor types can be sent, which can be combined with the optically resolved tip location to provide improved sensing of the instrument motion.

Since accelerometers and gyroscopes are often relative sensors which tend to drift over time, the combination with an absolute determination by the optical waveguide-based touch sensing is a powerful one. A particular attribute of an active instrument using accelerometers is that the rate of movement which can be handled is much increased. The accelerometer data can inform the optical waveguide sensor as to where the instrument tip is likely to be found in the next scan. This helps to compensate for motion blur.

Relating the specific movement of an instrument as reported from internal motion sensors to the movement seen on the optical waveguide sensor is a possible way of confirming the instrument identity. The sensors could be internal to a specially constructed instrument or could be in a "collar" attached to a passive instrument. For example, an ordinary whiteboard marker will typically register well as a passive contact on an optical waveguide touch system. This can be useful in applications in which there is no graphical display associated with the touch-sensitive surface, but the path traced by an instrument on the surface is to be determined. However, attributes of the marker, such as the color of the ink, may not be easily detected by the waveguide-based system. Supplementary electronics attached to the marker could transmit to the touch-sensitive system data (for example, data relating to the motion of the instrument) which could be matched by the system with a corresponding path on the touch-sensitive surface. Once the sensed touch has been matched to the instrument, then attributes known by the system can be applied to the reports associated with that instrument. One example is the color of the marker. Another example is the size of the marker tip. Using motion information for identification and to supplement the quality of the reported motion could be applied to objects other than instruments, including fingers and objects which are to be used as physical controllers in contact with the touch-sensitive surface.

E. Power Management for Active Instruments

Regarding instrument charging, the body of a typical large instrument is reasonably well-suited to the use of popular cylindrical cells which may be non-rechargeable or externally rechargeable. However, it is likely to be preferable for the instruments to be rechargeable and for the charging to be supported by the touch-enabled device. An instrument holder could be provided with a facility to recharge the batteries, for example.

Regarding a low power mode, removal of an instrument from the holder could trigger the circuitry inside the instrument to be ready for presentation to the touch-sensitive surface. Otherwise, the instrument would be charging or in standby (low power) mode. Instruments with supplementary internal motion sensing (such as accelerometers) can use motion detection to control the internal circuit activity. When the instrument is motionless for a period of time, operation can be suspended. Occasional checking of the motion sensors can ensure that the instrument is fully operational when it comes into contact with the touch-sensitive surface.

When such an instrument is in motion and/or determined to be in proximity to the touch-sensitive surface, the touch-sensitive system can be placed into a mode which increases the time over which finger touches are analyzed before being reported. This is beneficial to reduce the chances of a spurious finger report being generated as the side of the writing hand lands on the touch-sensitive surface. The side of a hand can generate a finger-sized contact before coming fully to rest on the touch-sensitive surface. In this mode, the sensor will be slightly slower to respond to finger touches, but that will often be acceptable.

VII. Additional Modalities

A. Palm Management

When instruments are used with touch-sensitive surfaces more than a few inches in dimension, the user is likely to rest the side of the writing hand on the touch-sensitive surface. These are commonly known as "palm" touches even though they are most often associated with the side of the hand rather than the palm.

An optical waveguide touch-sensitive system can accommodate palm touches since not all of the light passing under the palm is likely to be absorbed and the pattern of optical beams can be arranged so that there is a high likelihood of some passing under the instrument tip, but not under the palm. For example, with optical emitters and detectors around the periphery of the touch-sensitive surface, there will usually be optical beams travelling between top and bottom (or front and back) of the surface which pass through the instrument contact area without touching the palm contact area, which will usually be to the right or left of the instrument tip.

Figure 18:
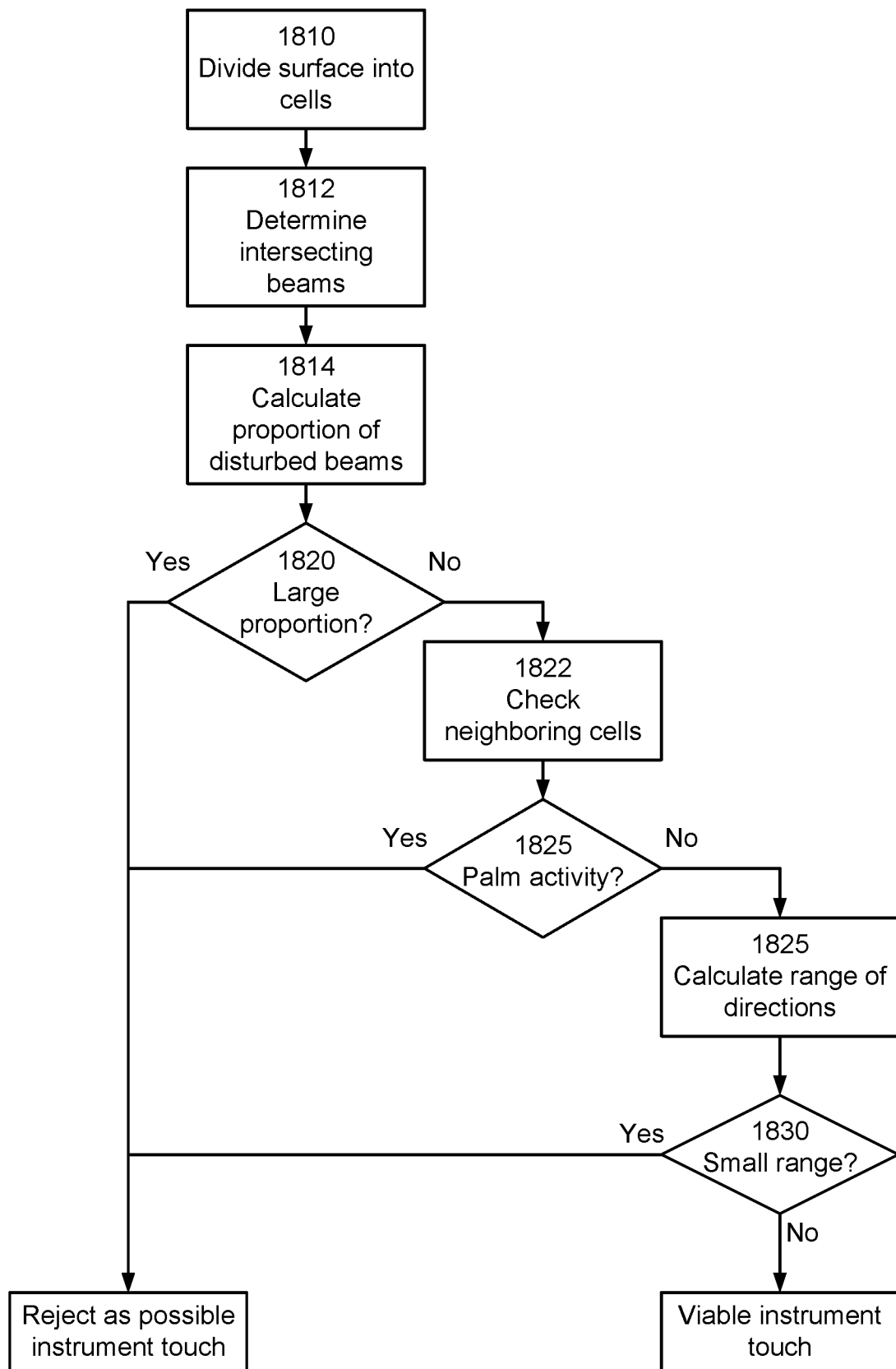
FIG. 18 is a flow diagram for qualifying possible instrument touches.

The first step in managing palm touches is to detect them. One way to detect a palm touch as distinct from an instrument touch is to divide the touch-sensitive surface into regions which can be referred to as "cells." In one embodiment, possible instrument touches are qualified, including eliminating palm touches, using cells according to the method shown in FIG. 18.

Divide 1810 the touch-sensitive surface into regions (cells) which are smaller than a palm's contact area and larger than an instrument's contact area. Determine 1812 which beams pass through each cell. Calculate 1814 the proportion of beams in the cell which have been disturbed by a touch. If the proportion is large 1820, then reject the cell as a possible instrument touch. If the proportion is small (e.g., below a threshold percentage) 1820, it may be an instrument touch but it may also be part of a larger palm touch. Consider these cells to be candidate instrument cells. For the candidate instrument cells, check 1822 the neighboring cells. Candidate instrument cells which have neighboring cells that show beam activity consistent with a palm touch are rejected as instrument touches, on the basis that the candidate instrument cell is probably a cell at the edge of a palm touch. In the remaining candidate instrument cells, calculate 1825 the range of angles of active beams. If the angular range is small 1830, the beam activity in the cell may be an artifact of touches elsewhere and the cell is rejected as an instrument touch. Otherwise 1830, the cell remains 1832 a viable candidate for an instrument touch. Other techniques can be applied to further determine whether there is an instrument touch.

Once palm activity has been identified, some applications may reject it by doing nothing more with the palm information. Other applications may determine attributes of each palm touch, such as the location, shape and size. Information about a palm touch can be used to provide enhanced performance. When an instrument is being used and the side of the writing hand is detected on the touch-sensitive surface, all further touches between the palm and the instrument tip can be ignored. For example, finger-like touches on the instrument side of a palm are likely to be associated with inadvertent finger/knuckle touches with the touch-sensitive surface. Some knowledge of the location and extent of the palm touch is helpful in determining the region in which inadvertent touches are to be ignored. A simple approach would be to ignore finger-like touches in a region of fixed size around the instrument tip.

B. Acoustics

Mechanical vibrations at the surface of a touch-sensitive device can be useful to determine the nature of a material that touches the surface. For example, a hard material landing on the surface will typically generate a sharp acoustic transient. Augmenting information from a waveguide touch-sensitive device with acoustic input from a contact microphone or other transducer associated with the touch-sensitive surface can provide additional capabilities to identify materials.

When the touch-sensitive device detects a new touch at a time which is coincident (within margins which allow for the respective latency of the two sensing methods) with the acoustic report, the acoustic signal can be associated with that touch. Further confidence in that association can be gained by analysis of the acoustic signal generated by movement of that touch and its consistency with the activity detected by the touch sensor.

An example of the application of such a system is the detection of instrument touches as distinct from finger touches on a touch-sensitive surface. If the instrument tip is composed of material which is not similar to a finger, then the characteristics of the vibration pattern generated on landing will be different. The tip material is important, but also the composition of the instrument itself. An instrument with a large mass will generate a different landing transient than one which is lightweight. Appendages may be introduced into the design of an instrument specifically to provide a distinctive acoustic signature. For example, a loose mass in the hollow body of an instrument can give rise to a second transient after the one generated by the landing of the tip.

The acoustic signal can also be used to reduce the power consumption of a touch-sensitive system. Scanning of the system may be disabled until an acoustic signal is detected, which may indicate the arrival of a new touch on the touch-sensitive surface.

Also, vibrations are typically present when a touch is lifted from the surface. This information can be particularly useful in overcoming the "stuck" touch problem in optical waveguide systems, where a patch of a contaminant left by a touch which has been lifted is sufficient for the system to falsely report that the touch is still present. The acoustic signal associated with the touch being lifted provides a helpful clue that it has in fact been removed and that only contamination remains on the surface at that location.

Acoustic detection can robustly reject vibrations caused by unrelated vibration activity. This can be achieved firstly by relying on high-frequency components in the acoustic signal. These are usually absorbed rapidly when passing through the body of a device. For example, an acoustic sensor in a computer display monitor on a desk will not usually receive much high frequency vibration energy from the desk because the desk material, the monitor housing and the soft padding on the underside of the monitor base will absorb it. So, the high frequency energy (which is also the energy that results in fast-moving acoustic transients) will usually result only from vibrations introduced at the surface of the monitor itself. Also, more than one acoustic sensor can be used and analysis of the signals from multiple sensors can determine whether the vibration originated at a point which is outside of the touch-sensitive area. For example, where there are contact microphones at the left and right edges of the touch-sensitive area, a transient generated by a landing event on the touch-sensitive area should arrive at the two sensors with a time difference which is smaller than the time-of-flight of the vibration across the area. If the time of arrival for the signal at the two sensors is different by the full span of the surface between them, then it can be concluded that it originated at a point which is outside of the touch-sensitive surface.

An extension of this time-of-flight analysis of the acoustic signal can determine an approximate location to be compared with that reported by the optical waveguide touch sensing so that the association between them can be more reliable.

Analysis of the signal can also be performed to determine the rise time and/or frequency spectrum of the transients and vibrations. A fast-moving transient edge can be identified by directly measuring the rate at which the signal changes over a succession of time-spaced samples, or by comparing the sampled signal with a synthetic or recorded template of a transient. Fast-moving/high frequency energy can also be detected by looking at the frequency content (spectrum) of the signal. In terms of Fourier synthesis, high harmonics have significant magnitude in such rapid acoustic transients. Again, this characteristic can be determined by directly analyzing the spectral content, or by comparison of the spectrum with a pre-determined template spectrum.

This type of analysis can also reveal information about the speed of movement of the touch along the touch-sensitive surface, particularly if there is some profiling of the touch-sensitive surface (although this is not a requirement). Estimation of the speed of travel can be done by analysis of the signal intensity, phase or spectrum at many transducers, or by the spectrum or change of intensity, phase or spectrum at a single transducer. A speed estimate can be useful supplementary data for a touch-sensitive sensor since it can help to estimate an expected location from one scan to the next.

When a touch is moving quickly, successive reported locations from the touch-sensitive system may be quite far apart, and it may not be obvious that the reports relate to the same touch. If the speed is known to be high, based on the acoustic signal, then this relationship between successive reports can be established.

Different touch types, or specific instances of touch types can be discerned using acoustic sensors. For example, two instruments could be distinguished by virtue of the tip material, the instrument mass or by additional aspects of the instrument design which causes the vibrations in the touch-sensitive surface to be distinguishable.

Contact microphones and similar transducers can be attached to the underside of the touch-sensitive surface (i.e. the side facing away from the user) so that an uncluttered surface can be presented to the user. These would be connected to analog-to-digital conversion circuitry and the resulting time-sampled data made available to a microprocessor system. Some or all of the analysis could optionally be performed using analog electronics, but that is likely to be less preferable than digital processing.

VIII. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein.

What is claimed is:

1. A method for processing a detected touch event on a touch-sensitive surface by an active instrument, the touch-sensitive surface having emitters and detectors arranged around its periphery, the active instrument disturbing at least some touch-detection optical beams that propagate from the emitters to the detectors through a waveguide, the active instrument having an emitter positioned to inject a communication optical beam into the waveguide when the active instrument is in contact with the touch-sensitive surface, the communication optical beam encoded with information about the active instrument, the method comprising:
   receiving beam data indicating properties of touch-detection optical beams detected by the detectors;
   from the beam data, determining a set of disturbances of the touch-detection optical beams caused by the active instrument;
   determining a location of the touch event by the active instrument based on the set of disturbances;
   receiving, by one or more of the detectors, the communication optical beam encoded with information about the active instrument;
   recreating the information about the active instrument from the received communication optical beam; and
   associating the information about the active instrument with the detected touch event.

2. The method of claim 1, wherein the touch-detection optical beams propagate through the waveguide by total internal reflection, and the disturbances of the touch-detection optical beams are a result of frustrated total internal reflection caused by the active instrument touching the touch-sensitive surface.

3. The method of claim 1, further comprising distinguishing the active instrument touch event from a finger touch event based on the injection of the communication optical beam by the active instrument.

4. The method of claim 1, wherein the information about the active instrument includes data relating to an identity of the active instrument.

5. The method of claim 4, further comprising identifying, based on the data relating to the identity of the active instrument, which of a set of active instruments is the active instrument causing the touch event.

6. The method of claim 1, wherein the information about the active instrument includes data relating to a contact force of the active instrument.

7. The method of claim 6, further comprising identifying, based on the data relating to the contact force, the contact force applied by the active instrument to the touch-sensitive surface.

8. The method of claim 1, wherein the information about the active instrument includes data relating to an orientation of the active instrument.

9. The method of claim 8, further comprising identifying, based on the data relating to the orientation, the orientation of the active instrument.

10. The method of claim 1, wherein the information about the active instrument includes data relating to a motion of the active instrument.

11. The method of claim 10, further comprising identifying, based on the data relating to the motion, the motion of the active instrument.

12. The method of claim 1, further comprising using the communication optical beam to detect the active instrument touch event.

13. The method of claim 12, wherein a strength of the communication optical beam varies as a function of distance from the active instrument and the method further comprises estimating a distance between a detector and the active instrument based on the response of the detector to the communication optical beam.

14. The method of claim 12, wherein the emitter of the active instrument injects multiple additional optical beams into the waveguide and the method further comprises using the injected additional optical beams to triangulate a position of the active instrument.

15. The method of claim 12, wherein the emitter of the active instrument injects multiple additional optical beams into the waveguide and the method further comprises using intersections of injected additional optical beams to determine a position of the active instrument.

16. The method of claim 1, wherein the active instrument includes a detector positioned to extract an additional optical communication beam from the waveguide when the active instrument is in contact with the touch-sensitive surface.

17. The method of claim 16, wherein the additional optical communication beam provides a communication channel to the active instrument.

18. The method of claim 1, wherein the active instrument includes a wireless communication channel to the device.

19. The method of claim 18, wherein the active instrument provides data relating to a position, orientation, or motion of the active instrument via the wireless communication channel, and the active instrument touch event is distinguished from finger touch events based on the data provided via the wireless communication channel.

20. An optical touch-sensitive device comprising:
a surface for which touch events are to be detected;
emitters and detectors arranged around a periphery of the surface, the emitters configured to produce touch-detection optical beams that propagate along a waveguide to detectors, wherein touches on the surface disturb at least some of the touch-detection optical beams; and
a touch event processor coupled, directly or indirectly, to the emitters and detectors, the touch event processor configured to:
receive beam data indicating properties of touch-detection optical beams detected by the detectors;
from the beam data, determine a set of disturbances of the touch-detection optical beams caused by a touch event on the surface by an active instrument;
determine a location of the touch event by the active instrument based on the set of disturbances;
receive communication optical beam data encoded with information about the active instrument, the communication optical beam data having been generated based on a communication optical beam detected by one or more of the detectors, wherein the communication optical beam was injected into the waveguide by the active instrument and encoded with information about the active instrument;
recreate the information about the active instrument from the received communication optical beam; and
associate the information about the active instrument with the detected touch event.

21. The optical touch-sensitive device of claim 20, wherein the touch-detection optical beams propagate through the waveguide by total internal reflection, and the disturbances of the touch-detection optical beams are a result of frustrated total internal reflection caused by the active instrument touching the touch-sensitive surface.

22. The optical touch-sensitive device of claim 20, wherein the touch event processor is further configured to distinguish the active instrument touch event from a finger touch event based on the injection of the communication optical beam by the active instrument.

23. The optical touch-sensitive device of claim 20, wherein the information about the active instrument includes data relating to an identity of the active instrument, and wherein the touch event processor is further configured to identify, based on the data relating to the identity of the active instrument, which of a set of active instruments is the active instrument causing the touch event.

24. The optical touch-sensitive device of claim 20, wherein the information about the active instrument includes data relating to a contact force of the active instrument, and wherein the touch event processor is further configured to identify, based on the data relating to the contact force, the contact force applied by the active instrument to the touch-sensitive surface.

25. The optical touch-sensitive device of claim 20, wherein the information about the active instrument includes data relating to an orientation of the active instrument, and wherein the touch event processor is further configured to identify, based on the data relating to the orientation, the orientation of the active instrument.

26. The optical touch-sensitive device of claim 20, wherein the information about the active instrument includes data relating to a motion of the active instrument, and wherein the touch event processor is further configured to identify, based on the data relating to the motion, the motion of the active instrument.

27. The optical touch-sensitive device of claim 20, wherein the touch event processor is further configured to detect the active instrument touch event based at least in part on the communication optical beam.

28. The optical touch-sensitive device of claim 27, wherein a strength of the communication optical beam varies as a function of distance from the active instrument, and wherein the touch event processor is further configured to estimate a distance between a detector and the active instrument based on the response of the detector to the communication optical beam.

29. The optical touch-sensitive device of claim 27, wherein the active instrument injects multiple additional optical beams into the waveguide, and wherein the touch event processor is further configured to triangulate a position of the active instrument based on the injected additional optical beams.

30. The optical touch-sensitive device of claim 27, wherein the active instrument injects multiple additional optical beams into the waveguide, and wherein the touch event processor is further configured to determine a position of the active instrument based on intersections of injected additional optical beams.

31. The optical touch-sensitive device of claim 20, wherein the active instrument includes a detector positioned to extract an additional optical communication beam from the waveguide when the active instrument is in contact with the touch-sensitive surface, the additional optical communication beam providing a communication channel to the active instrument.

\* \* \* \* \*